United States Patent
Le Roux et al.

(10) Patent No.: US 12,387,417 B2
(45) Date of Patent: Aug. 12, 2025

(54) METHOD AND APPARATUS FOR ENCODING AND DECODING VOLUMETRIC VIDEO

(71) Applicant: InterDigital CE Patent Holdings, SAS, Paris (FR)

(72) Inventors: Jean Le Roux, Rennes (FR); Charles Salmon-Legagneur, Rennes (FR); Yvon Legallais, Rennes (FR); Franck Aumont, Vern sur Seiche (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 68 days.

(21) Appl. No.: 18/008,894

(22) PCT Filed: May 31, 2021

(86) PCT No.: PCT/EP2021/064567
§ 371 (c)(1),
(2) Date: Dec. 7, 2022

(87) PCT Pub. No.: WO2021/249812
PCT Pub. Date: Dec. 16, 2021

(65) Prior Publication Data
US 2023/0215080 A1    Jul. 6, 2023

(30) Foreign Application Priority Data
Jun. 9, 2020  (EP) .................... 20305616

(51) Int. Cl.
*G06T 15/08* (2011.01)
*G06T 15/20* (2011.01)
*G06T 17/20* (2006.01)

(52) U.S. Cl.
CPC ............. *G06T 15/08* (2013.01); *G06T 15/20* (2013.01); *G06T 17/20* (2013.01)

(58) Field of Classification Search
CPC ......... G06T 15/08; G06T 15/20; G06T 17/20; H04N 13/161; H04N 13/261; H04N 19/46;
(Continued)

(56) References Cited

U.S. PATENT DOCUMENTS 11,367,247 B2 *   6/2022   Thudor .................. G06T 15/08
11,910,054 B2 *   2/2024   Travert ............ H04N 21/21805
(Continued)

FOREIGN PATENT DOCUMENTS

EP       3489900 A1    5/2019
GB       2572996 A    10/2019

OTHER PUBLICATIONS

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

(Continued)

*Primary Examiner* — Vijay Shankar
(74) *Attorney, Agent, or Firm* — Condo Roccia Koptiw LLP

(57) ABSTRACT

Methods, devices and stream are disclosed to encode and decode a volumetric content. At the encoding, the space of the volumetric content is divided in distinct sectors according to at least two different sectorizations. One atlas is generated for each sectorization or a single atlas is generated encoding all the sectorizations. At the decoding, a sectorization is selected according to the current direction and field of view, according to user's gaze navigation and according to prediction of the upcoming pose of the virtual camera controlled by the user. Sectors are selected according the selected sectorization and the current direction and field of view and only patches encoded in regions of the atlas (Continued)

associated with these sectors are accessed to generate the viewport image representative of the content seen from the current point of view.

16 Claims, 6 Drawing Sheets

(58) Field of Classification Search
CPC ............. H04N 21/84; H04N 21/21805; H04N 21/234318; H04N 21/816; H04N 21/23412; H04N 21/2353; H04N 19/597
See application file for complete search history.

(56) References Cited

U.S. PATENT DOCUMENTS

| | | | |
|---|---|---|---|
| 2006/0284880 A1 | 12/2006 | Zhou et al. | |
| 2020/0380765 A1* | 12/2020 | Thudor | G06T 9/00 |
| 2023/0007338 A1* | 1/2023 | Travert | H04N 21/85406 |
| 2023/0143601 A1* | 5/2023 | Salmon-Legagneur | G06T 7/11 |
| | | | 375/240.12 |
| 2023/0217006 A1* | 7/2023 | Chupeau | H04N 19/597 |
| | | | 345/419 |

OTHER PUBLICATIONS

Anonymous, "AV1 Codec Library", Alliance for Open Media, Url: https://aomedia.googlesource.com/aom, 13 pages.

Tourapis et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), Document No. JVT-AE010, 31st Meeting: London, Great Britain, Jun. 28, 2009, 90 pages.

Boyce et al., "Working Draft 3 of Immersive Video", International Organization for Standardization, ISO/IEC JTC1/SC29/WG11, Coding of Moving Pictures and Audio, Document: MPEG2018/M18794, Geneva, Switzerland, Oct. 2019, 49 pages.

Anonymous, Terminal Equipment and Protocols for Telematic Services—Information Technology—Digital Compression and Coding of Continuous-Tone Still Images—Requirements and Guidelines, International Telecommunication Union (ITU), The International Telegraph and Telephone Consultative Committee (CCITT), Document: T.81, Sep. 1992, 189 pages.

Duanmu et al, "View Direction and Bandwidth Adaptive 360 Degree Video Streaming using a Two-Tier System", Institute of Electrical and Electronics Engineers (IEEE), 2017 IEEE International Symposium on Circuits and Systems (ISCAS), Baltimore, Maryland, USA, May 28, 2017, 4 pages.

Yanyu et al, "Gaze Prediction in Dynamic 360° Immersive Videos", Institute of Electrical and Electronics Engineers (IEEE), 2018 IEEE/CVF Conference on Computer Vision and Pattern Recognition, Salt Lake City, Utah, USA, Jun. 18, 2018, 10 pages.

Anonymous, "High Efficiency Video Coding", ITU-T Telecommunication Standardization Sector of ITU, Series H: Audiovisual and Multimedia Systems, Infrastructure of audiovisual services—Coding of moving video, Recommendation ITU-T H.265, Feb. 2018, pp. 1-692.

Anonymous, "Information Technology—Coding of Audio-Visual Objects—Part 10: Advanced Video Coding", International Standard, ISO/IEC 14496-10, Second Edition, Oct. 1, 2004, 280 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

ITU, "Information Technology—Digital Compression and Coding of Continuous-Tone Still Images—Requirements and Guidelines", Terminal Equipment and Protocols for Telematic Services, The International Telegraph and Telephone Consultative Committee (CCITT), T.81, Sep. 1992, 186 pages.

ITU-T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

* cited by examiner

METHOD AND APPARATUS FOR ENCODING AND DECODING VOLUMETRIC VIDEO

CROSS REFERENCE TO RELATED APPLICATIONS

This application is a U.S. National Stage Application under 35 U.S.C. 371 of International Patent Application No. PCT/EP2021/064567, filed May 31, 2021, which is incorporated herein by reference in its entirety.

This application claims priority to European Patent Application No. 20305616.3, filed Jun. 9, 2020.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4πsteradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

A technical approach for the encoding of volumetric video is based on the projection of the 3D scene onto a multiplicity of 2D images, called patches, packed into atlases which can be further compressed using conventional video encoding standards (e.g., HEVC). At the decoding, using every patch of an atlas to prepare the rendering of the 3D scene in the current viewport is not always required, nor desirable. Indeed, some patches comprise information about points that are not visible from the current point of view and, for a given part of the 3D scene to be rendered, some patches comprise information more accurate than other patches comprising information for the same part of the scene when viewed from the current point of view.

The success of emerging technology like immersive media (MPEG Immersive Video-MIV based on a 3DoF+ approach) is often determined by the wide adoption of this technology on everyday devices like on embedded low-end user devices like digital TV, set-top-boxes or tablets, or wireless HMD. However, these devices have low GPU resource and the immersive technology must be also adapted for this type of devices. A possible approach could be to generate two types of content, one degraded immersive content for low-end user devices, and one to get richer immersive experience on high-end user gamers' PC. Such an approach requires the storage of several versions of a same content and the knowledge of the type of client device for the transmission of the adapted version. Another approach is based on tiling methods. However, such an approach has the drawback to introduce latency in the streaming as the server has to be informed of the location and direction of every immersive rendering client devices to send the corresponding tiles.

There is a lack of a data stream format for encoding volumetric video which enables the decoder to select a subset of patches within the obtained atlas, to be accessed and used by the rendering engine, the subset depending on the current location and direction of user's point of view.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

In the context of a patch-based transmission of a volumetric video content, the present principles relate to a method comprising:

selecting a sectorization of a space of a volumetric content among at least two different sectorizations of the space and a sector of the sectorization according to a view direction within the space;

obtaining an atlas image representative of the volumetric content. The atlas image is encoded according to the sectorization, in a way that a region of the atlas image is associated with a sector of the sectorization; and rendering the volumetric content from the view direction by accessing pixels of the regions associated with the selected sector.

In an embodiment, the atlas image is packing patch pictures. A patch picture belongs to one region of the atlas image and is a projection of points of the volumetric content comprised in the sector of the space associated with this one region.

In an embodiment, selecting a sectorization is performed according to a change of the view direction in time. In another embodiment, the volumetric content is a volumetric video and the selecting of a sectorization is performed for a group of pictures of the volumetric video. In an embodiment, the volumetric content may be organized and encoded according to at least two sectorizations of the space of the volumetric content. The atlas image may be obtained from a data stream comprising metadata associating sectors of a sectorization with a region of the atlas image. In a variant, the selecting of a sectorization is performed according to a prevision of a future value of the view direction.

The present principles also relate to a device comprising a processor configured to implement the method above.

The present principles also relate to a method comprising:
obtaining at least two sectorizations of a space of a volumetric content;
generating an image divided in regions, a region being associated with a sector of each of at least two sectorizations;
wherein points of the volumetric content comprised in a sector of the space are projected into pixels of a region associated with the sector.

The present principles also relate to a device comprising a processor configured to implement the method above.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
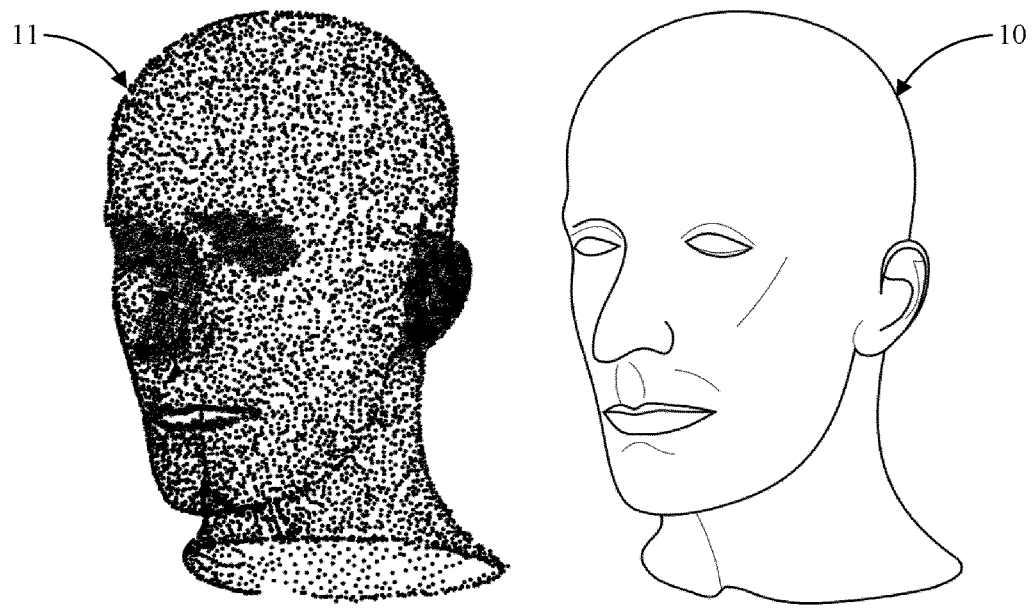
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

In the context of a patch-based encoding of a 3D scene, the data stream comprises metadata comprising information about each patch of the atlas. Via these patch data, each patch is associated to projection data comprising the parameters of the virtual camera which captures the patch at the encoding. At the decoding, these parameters (e.g. pose and 3D-to-2D projection method) of the virtual cameras are retrieved from the stream, in order to perform the inverse 2D-to-3D conversion.

A volumetric video is prepared (i.e. analyzed and encoded) to be rendered from a viewing zone that is a part of the 3D space of the 3D scene. Points of the 3D scene visible from any point of view of this viewing zone are encoded in the patches of the atlas. If the decoded 3D scene is viewed from a point of view outside of the viewing zone, some points are missing, and the 3D scene is incomplete and/or present strong visual artifacts. In a 3DoF rendering mode, the viewing zone is limited to a point of the 3D space of the 3D scene. In a 3DoF+ rendering mode, the viewing zone is a limited region around an initial point of the 3D space. In 6DoF, the viewing zone is the entire 3D space of the 3D scene.

The present principles relate methods, data stream and devices for rendering a volumetric content according to a view direction within the space of the content. A volumetric content is a visual content in three dimension that is rendered according to the position and to the view direction of a virtual camera controlled by the viewer and located in the 3D space of the volumetric content. According to the present principles, the space of the volumetric content is sectorized as described in relation to FIG. 8. The 3D scene of the volumetric content is encoded in a patch atlas image. The layout of the atlas is determined according to the selected sectorization: the atlas is divided in regions; each region being associated with a sector of the sectorization. In an embodiment, a region may be associated with sectors of different sectorizations. When rendering the volumetric content, a sectorization (i.e. a division of the 3D space of the scene) is selected and a sector is selected according tot the current view direction of the virtual camera. An atlas organized according the selected sectorization is obtained. The volumetric content is rendered by accessing only the patches encoded in regions of the atlas image associated with the current sector of the selected sectorization. In an embodiment, the selection of the sectorization is performed according to the movements of the virtual camera (i.e. according to previous view directions and, in an embodiment, according to a prediction of future view directions). Examples of different sectorizations to be applied to a volumetric content are described herein. According to the present principles, a same 3D scene may be sectorized according to several sectorizations. A video content is generated for each of these sectorizations.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
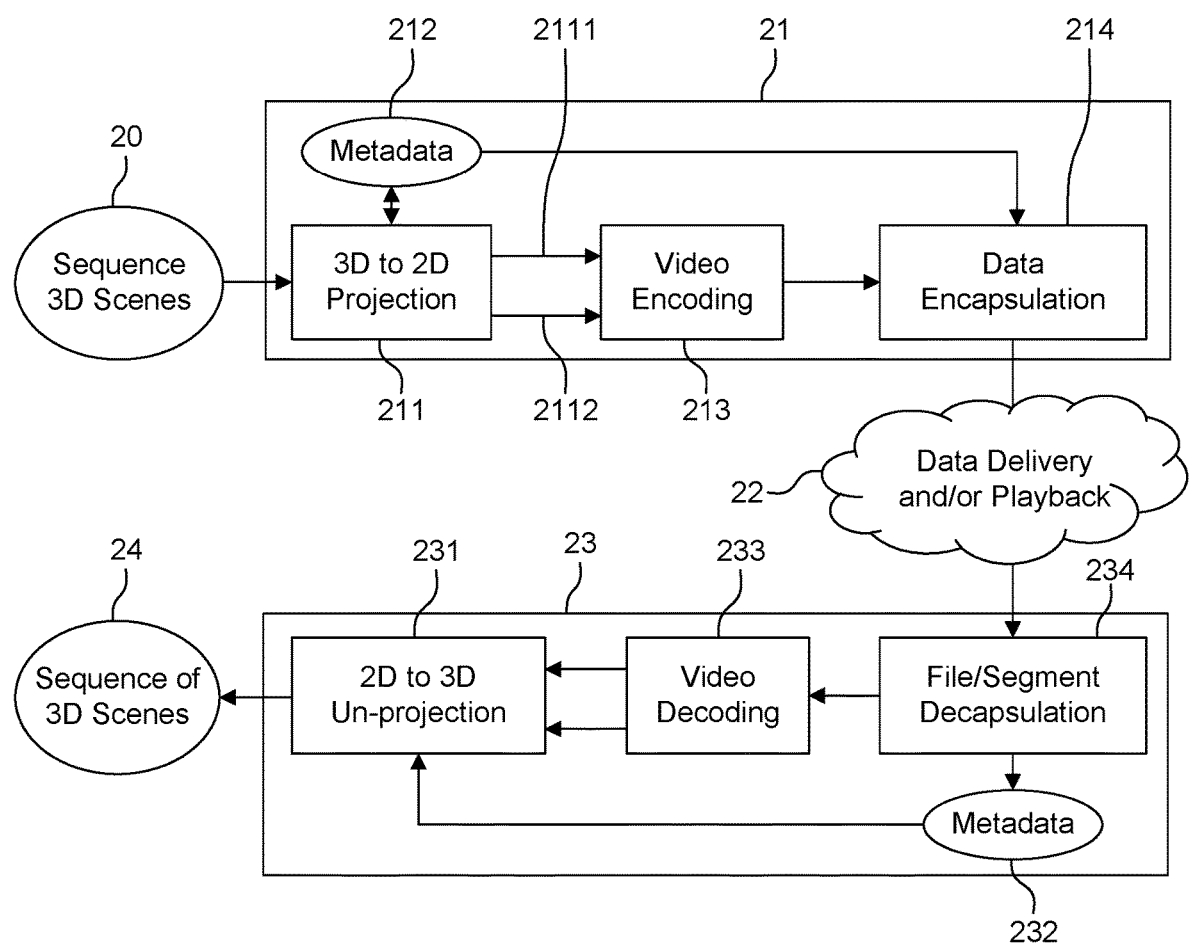
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes is provided according to a viewing zone from which the 3D scene may be viewed at the decoding side. 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by the bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

According to the present principles, at least one validity domain is determined by projection circuit 211. A validity domain is an information describing a part of the viewing zone. A validity domain may be representative of a connected 3D region or a possibly disconnected union of connected regions. Projection circuit 211 associates every patch it generated with a validity domain. In a variant, projection circuit 211 does not associate some of the patches with any validity domain, indicating that the validity domain of this patch is the entire viewing zone. A part of the 3D space is delimited and associated with a patch when the information projected onto this patch are necessary and accurate to re-build the 3D scene for a view from a point of view encompassed in this part of the 3D space at the rendering. A same validity domain may be associated with several patches. A description of determined validity domains and the associations between patches and validity domains is added to metadata 212, so this information is going to be encapsulated in the data stream by data encapsulation circuit 214.

In an embodiment of the present principles, validity domains are determined in relation to centers of projection. The validity domain determined for one center of projection is associated with every patch generated according to this projection center as described in reference to FIG. 5. Descriptions of validity domains added in metadata 212 are associated with projection data describing the different projection operations used to generate patches of the atlas.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. A frame is an atlas, that is image data comprising a set of patches packed in the frame. A patch is image data comprising information to retrieve points of the 3D scene to reconstruct. In a variant, video decoder 233 provides two sequences of frames, one comprising color information, the other comprising depth information.

According to the present principles, metadata 232 comprise at least one validity domain associated with at least one patch of the atlas. A validity domain is an information representative of a part of the viewing zone of the 3D space of the 3D scene.

A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

A 3D scene is retrieved from an atlas in which a plurality of patches is packed. According to the present principles, circuit 231 de-project pixels of a subset of the patches of the atlas. Circuit 231 selects only patches which are associated (via metadata 232) to a validity domain encompassing the current point of view of the rendering. In a variant, if a patch is associated to no validity domain, this patch is always used for de-projecting.

In an embodiment of the present principles, metadata 232 comprise a collection of a patch data. In a patch data item, the patch is associated with projection data comprising parameters of the projection operation used for generating this patch. Metadata 232 also comprise a collection of projection data and a projection data is associated with a validity domain. In this embodiment, circuit 231 selects, for de-projecting, the patches which are associated with a projection data which is, itself, associated with a validity domain encompassing the current point of view.

Figure 3:
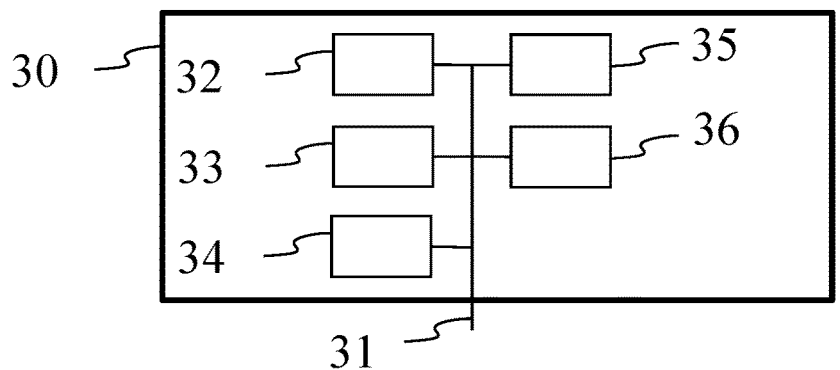
FIG. 3 shows an example architecture of a device which may be configured to implement a method described in relation with FIGS. 11 and 12 according to a non-limiting embodiment of the present principles.
Figure 11:
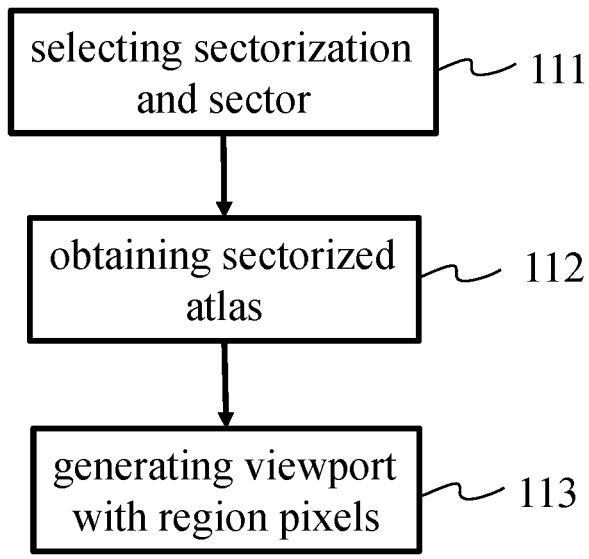
FIG. 11 illustrates a method for generating a viewport image of a scene encoded in an atlas image, according to a non-limiting embodiment of the present principles.
Figure 12:
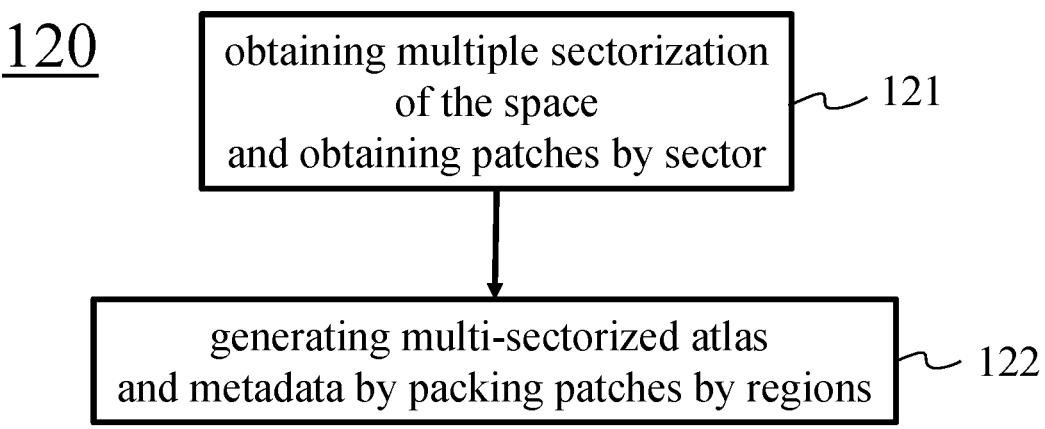
FIG. 12 illustrates a method for encoding a scene, according to a non-limiting embodiment of the present principles.

FIG. 3 shows an example architecture of a device 30 which may be configured to implement a method described in relation with FIGS. 11 and 12. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 11 and 12, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
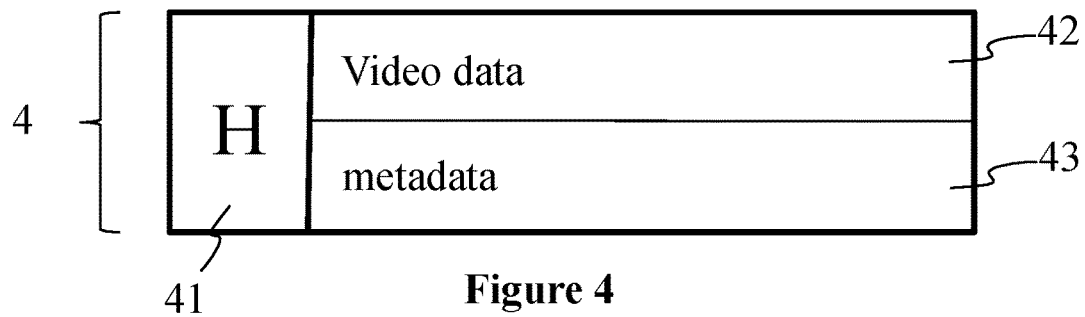
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards). According to the present principles, metadata of element of syntax 43 also comprise at least one validity domain associated with at least one patch of the atlas. A validity domain is an information representative of a part of the viewing zone of the 3D space of the 3D scene and may be encoded according to different representations and structures. Examples of such representations and structures are provided in the present disclosure.

For example, metadata comprise a collection of at least one validity domain. Items of this collection may be indexed, for example by a letter or by an integer. Metadata further comprise a collection of projection data comprising at least a reference to one of the validity domains. The reference may be, for instance the index of the validity domain in the collection or a pointer to the memory address of this data. In this example, metadata also comprise a collection of patch data comprising a reference to a patch and a reference to one of the projection data.

Figure 5:
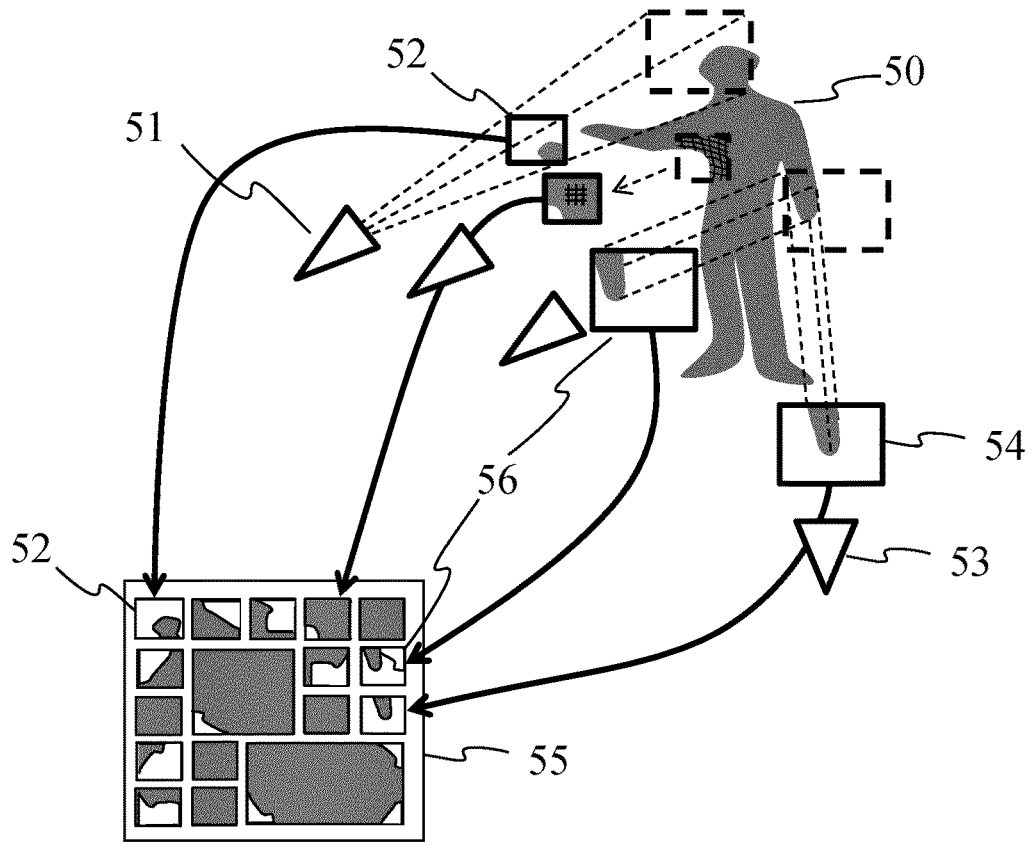
FIG. 5 shows an example of a patch-based representation of a three-dimensional (3D) scene, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
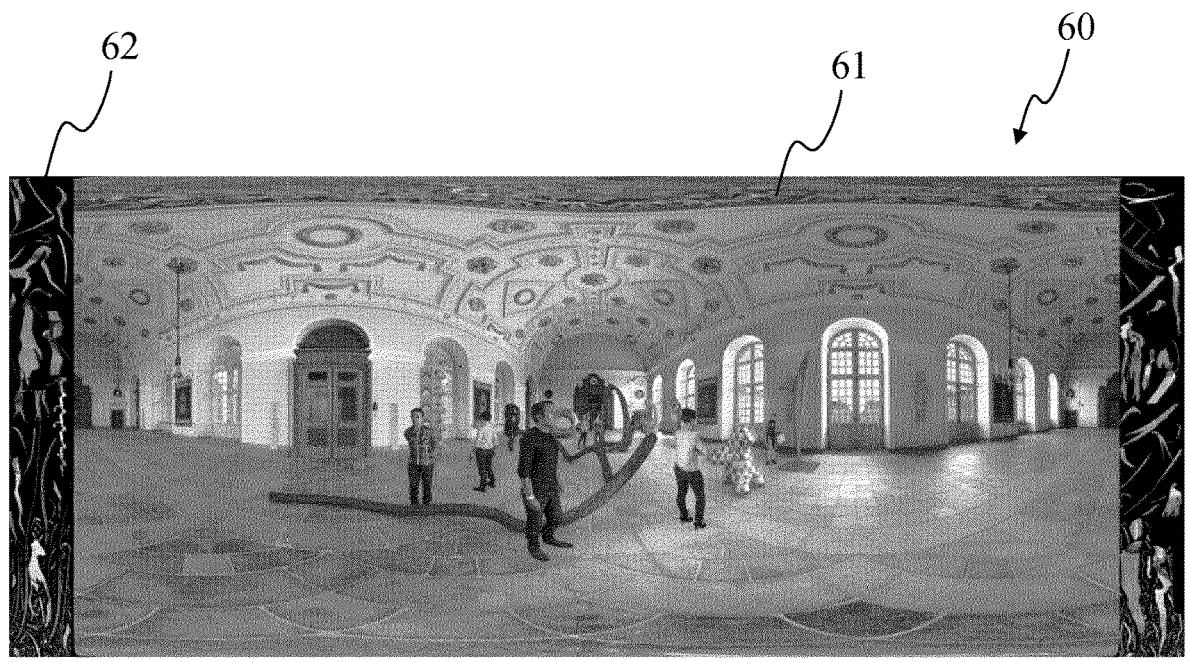
FIG. 6 shows an example of an atlas comprising the texture information of the points of a 3D scene, according to a non-limiting embodiment of the present principles.

FIG. 6 shows an example of a layout of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

The layout of an atlas is the way patches are organized on the image plane of the atlas. In the example of FIG. 6, atlas 60 comprises a first part 61 comprising the texture information of the points of the 3D scene that are visible from a point of view and one or more second parts 62. The texture information of the first part 61 may for example be obtained according to an equirectangular projection mapping, an equirectangular projection mapping being an example of spherical projection mapping. In the example of FIG. 6, the second parts 62 are arranged at the left and right borders of the first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view (the texture of which being stored in the first part) and by projecting the remaining points according to a point of view different from the first point of view, for example from one or more second point of view of a space of view centred onto the central point of view (e.g. the viewing space of a 3DoF rendering).

The first part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only the first part 61) and with 3DoF+/6DoF rendering.

Figure 7:
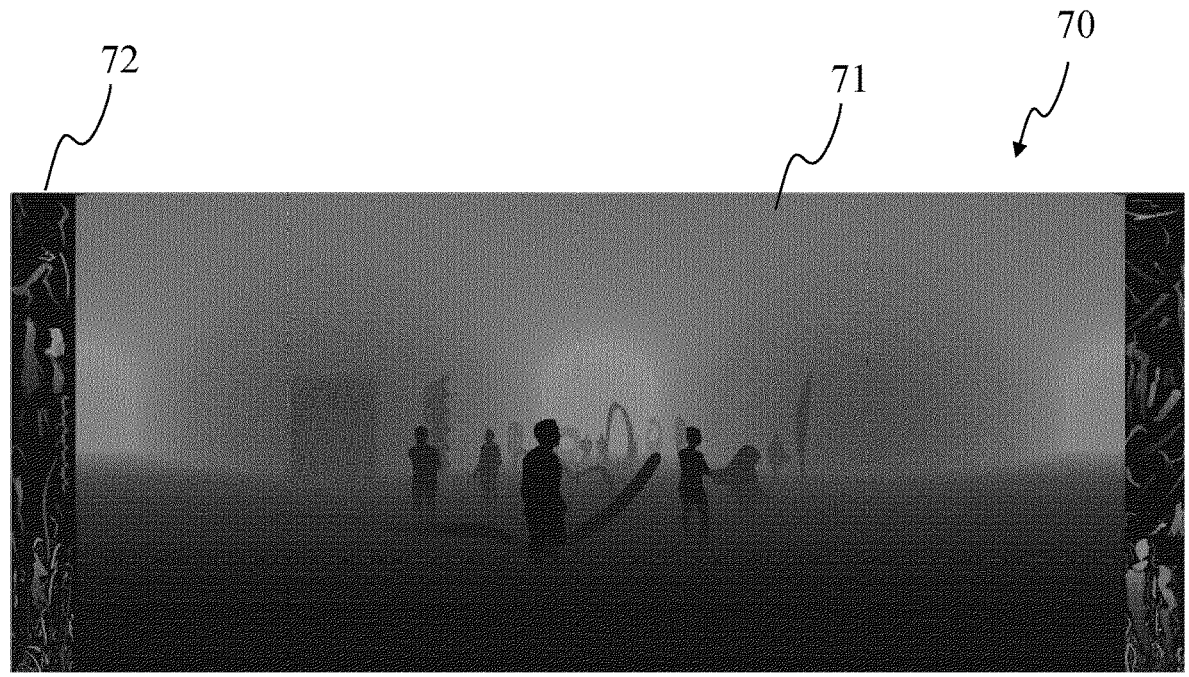
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6 and having the same layout than the atlas of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 62. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. the first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

In existing art, after having decoded the color and depth atlases, the rendering device carries out the reverse operations for a 3D rendering. The immersive rendering device un-projects each pixel of each patch of the atlases to rebuild a 3D point, and re-projects the 3D point into the viewport of the current pyramid of vision of the user.

This implies two types of operations on the rendering device:
- memory lookups to fetch the color and depth values of each pixel in the atlases (operations capped by the GPU memory bandwidth); and computing to un-project/re-project each point (operations well adapted to massively parallel GPU architecture).

In a typical implementation, the rendering engine pipelines the processing of vertex/fragment shaders, that are executed for each pixel of the atlases, but triggers several memory lookups equals to the size of the atlases. For example, for a 4K HMD supporting up to 15 pixels per degree, an atlas is composed of more than 17 M pixels (5.3 K×3.3 K).

This approach has a noticeable drawback: the atlases contain patches for any direction (360°×180°), while only the patches belonging to the end-user device Field of View (typically a 90°×90° FOV for a HMD) are effectively visible in the current viewport; then, the rendering engine may read up to 8 times more pixels than necessary.

According to the present principles, for fast rendering on low-end user devices, the number of memory look-ups and de-projections is decreased by reading only the subset of patches in the atlas that are visible in the current user's field of view; i.e. selecting only the patches appearing in the user view direction.

Figure 8:
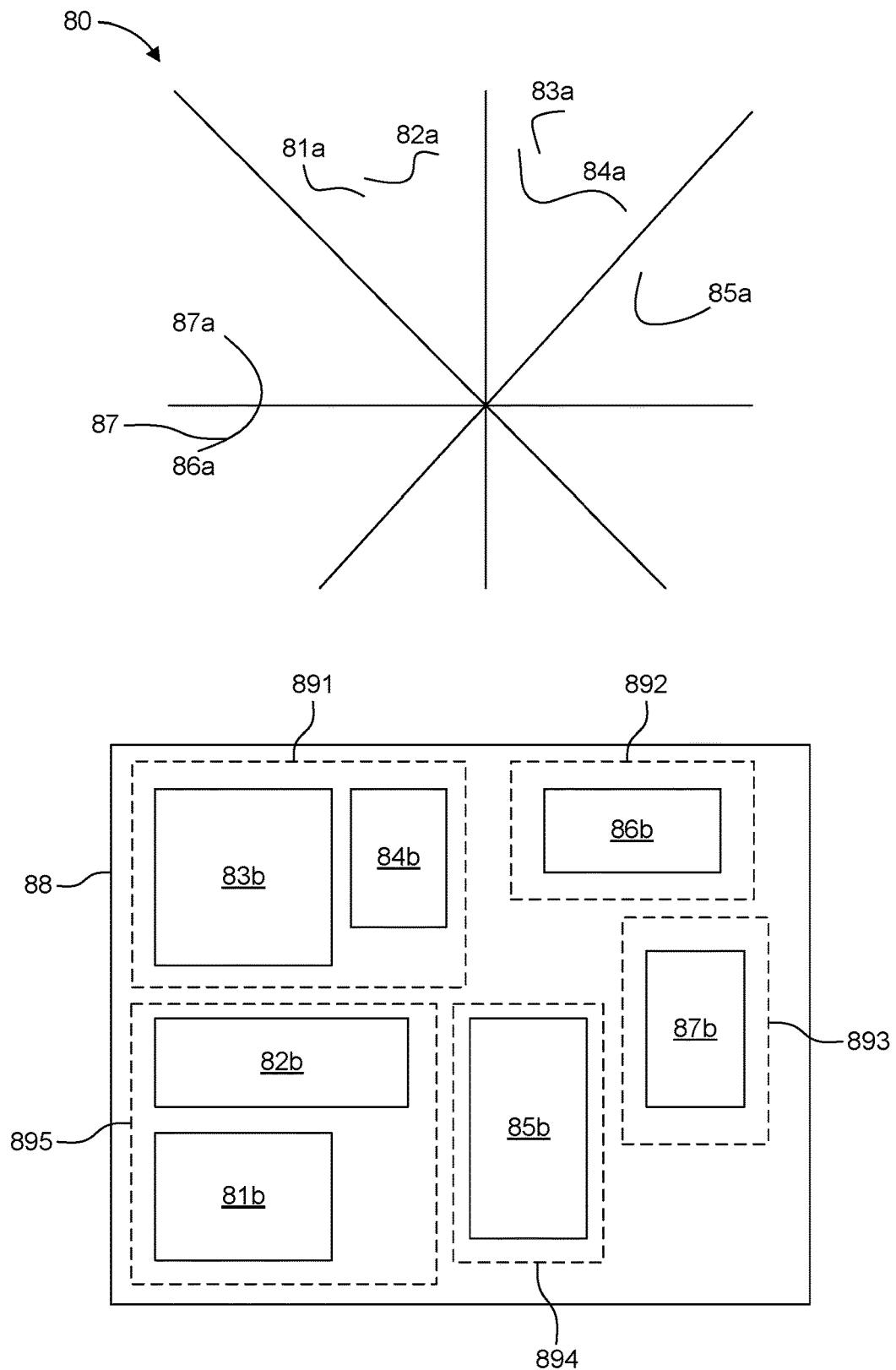
FIG. 8 illustrates an embodiment of a sectorization of the 3D space of the 3D scene.

FIG. 8 illustrates an embodiment of a sectorization of the 3D space of the 3D scene. In this example, a spherical projection and mapping, like Equi-Rectangular Projection (ERP), is selected to project points of the 3D scene onto patches of an atlas. A sector is a disjointed part (i.e. non-overlapping another sector) of the 3D space of the 3D scene. In this particular embodiment, a sector is defined by a solid angle; that is a (theta, phi) range pointing a reference point (e.g. the center point of view of the 3DoF+ viewing box) of the 3D space, where theta and phi are the polar coordinates.

In FIG. 8, space 80 of the scene is divided in eight sectors of the same size. Sectors may have different sizes and may not cover the entire space of the scene. The number of sectors is selected to optimize the encoding and the decoding according to the principles detailed herein. Scene 80 comprises several objects or parts of objects 81a to 87a. Points of the scene are projected on patches as illustrated on FIG. 5. Parts of objects to be projected on patches are selected in a way that ensures that pixels of a patch are a projection of points of a same sector. In the example of FIG. 8, object 87 have points belonging to two sectors. Then, points of objects 87 are split in two parts 86a and 87a, so, when projected, points of part 86a and points of part 87a are encoded in two different patches. Patches associated with a same sector are packed in a same region of the atlas. For instance, a region is a rectangular area of the atlas image, a region may pack several patches. In a variant a region may have a different shape, for example, a region may be delimited by an ellipse or by a generic polygon. Patches of a same region are projections of points of a same sector. In the example of FIG. 8, five of the eight sectors of the space of the scene comprise points. According to the present principles, atlas image 88 representative of the scene comprises five regions 891 to 895. A region pack patches which are projection of a points belonging to a same sector. For instance, in FIG. 8, region 891 comprises patches 83b and 84b corresponding to groups of points 83a and 84a which belong to a same first sector. Groups of points 86a and 87a, even if parts of a same object 87, as they belong to two separate sectors produce two patches 86b and 87b. Patches 86b is packed in a region 892 while patch 87b is packed in a different region 893. Patch 85b is packed in a region 894 because corresponding points of the scene belong to a second sector and patches 81b and 82b respectively corresponding to groups of points 81a and 82a are packed in a region 895 as being comprised in a same sector.

Figure 9:
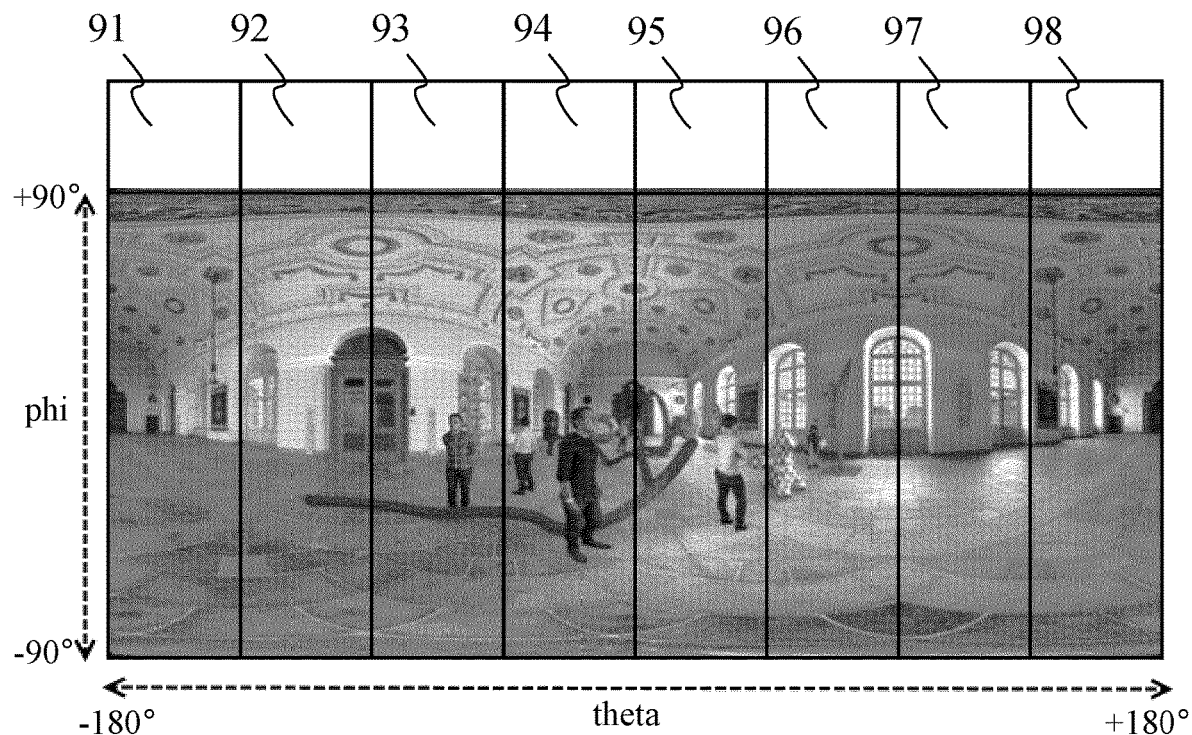
FIG. 9 illustrates a first layout of a sectorized atlas according to the present principles.

FIG. 9 illustrates a first layout of a sectorized atlas according to the present principles. To take advantage of the central view of FIGS. 6 and 7, the central patch is split into n sectors (8 in the example of FIG. 9) to obtain 8 regions. In this embodiment, each central region comprises information corresponding to the same angular amplitude and so exactly the same number of pixels when projected onto an ERP image. Peripheral patches are also sorted by sector of same angular amplitude (8 more in the example of FIG. 9), and then packed into peripheral regions 91 to 98. Unlike in central patch, the quantity of data by peripheral region is not the same because it depends on the quantity of parallax information for a given sector. In FIG. 9, the peripheral regions may have different sizes. In a variant, peripheral regions 91 to 98 have a same size. Unused pixels may be filled with a determined value, for instance 0 or 255 for depth atlases and white, grey or black for color atlases.

| Regions | Sector definition | Atlas Area |
| --- | --- | --- |
| 8 panoramic Regions $R_{c\_pan\_i}$ for central patch | For i = 0 to 7 theta [i*45°, i*45° + 45°] and phi [−90°, +90°] | ⅛ of central patch |
| 8 panoramic Regions $R_{p\_pan\_i}$ for peripheral patches | For i = 0 to 7 theta [i*45°, i*45° + 45°] and phi [−90°, +90°] | Around ⅛ of all peripheral patches |

Figure 10:
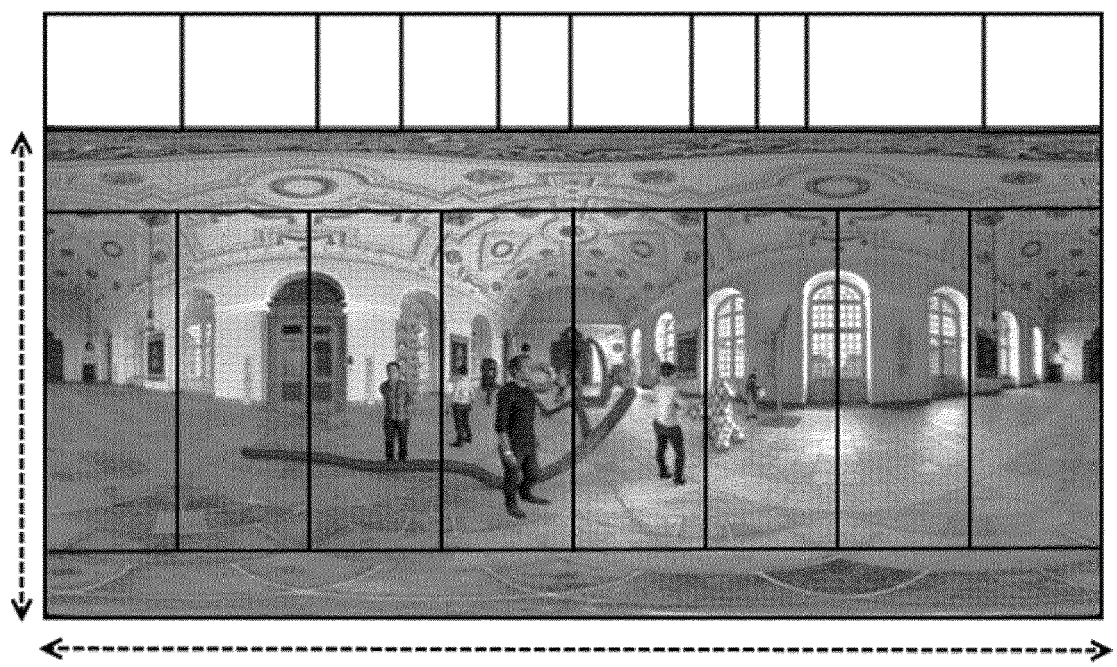
FIG. 10 shows a second layout of a sectorized atlas according to the present principles.

In a 3DoF+ rendering device, a processor manages a virtual camera located in the 3DoF+ viewing zone. The virtual camera defines the point of view and the field of view of the user. The processor generates a viewport image corresponding to this field of view. At any time, depending on the user viewport direction ($theta_{user}$, $phi_{user}$), the renderer selects at least one sector, for instance 3 or 4 sectors, and, then access and process the same number of central regions and peripheral regions. In the example of FIGS. 8 to 10, only 37.5% (3/8 sectors) or 50% (4/8 sectors) of the patches are processed. The number of selected sectors may be dynamically adapted by the renderer depending on its CPU and/or GPU capabilities. The number of selected sectors by the renderer at any time covers at least the field of view. Additional sectors may be selected to enhance reliability to render peripheral patches at the borders of the current FOV for lateral and/or rotation movements of the user. The number of selected sectors is determined to cover the current user field of view (FOV) with appropriate overprovisioning to respond positively to the motion to photon latency issue but being small enough to optimize the rendering (that is the number of regions of the atlas that the decoder accesses to generate the viewport image). An atlas layout like the one illustrated in FIG. 10 is adapted for a generic "gaze path". The number of selected (and so accessed by the decoder) sectors may corresponds to the entire atlas when the user is looking toward a pole. The rate of the accessed regions of the atlas is then 100%.

FIG. 10 shows a second layout of a sectorized atlas according to the present principles. In this example, wherein the selected projection and mapping is the ERP, the central patch of FIGS. 6 and 7 is divided in 10 regions: eight for a large equatorial zone as in the example of FIG. 9 and two for the poles. Ten regions of the atlas are then dedicated to peripheral patches of the ten sectors.

| Regions | Sector definition | Atlas Area |
|---|---|---|
| 8 panoramic Regions $R_{c\_pan\_i}$ for central patch | For i = 0 to 7 theta [i*45°, i*45° + 45°] and phi [−(90° + $phi_{fov}/2$), +(90° − $phi_{fov}/2$)] | 1/16 of central patch |
| 2 pole Regions $R_{c\_pol\_i}$ for central patch | theta [−180°, +180°] and phi [+(90° − $phi_{fov}/2$), +90°] theta [−180°, +180°] and phi [−(90° + $phi_{fov}/2$), −90°] | 1/4 of central patch |
| 8 panoramic Regions $R_{p\_pan\_i}$ for peripheral patches | For i = 0 to 7 theta [i*45°, i*45° + 45°] and phi [−(90° + $phi_{fov}/2$), +(90° − $phi_{fov}/2$)] | Around 1/16 of peripheral patches |
| 2 pole Regions $R_{p\_pol\_i}$ for peripheral patches | theta [−180°, +180°] and phi [+(90° − $phi_{fov}/2$), +90°] theta [−180°, +180°] and phi [−(90° + $phi_{fov}/2$), −90°] | Around 1/4 of peripheral patches |

This example layout differs from the first layout of FIG. 9 in terms of the number of selected sectors according the user's gaze direction and gaze path. Indeed, at the rendering side, regions of the atlas corresponding to the poles will be accessed and de-projected only when the user is looking upper or lower than a given angle (depending on the size of pole regions). In the layout of FIG. 9, when the user is looking at a pole, every central patch (that is every region) has to be accessed to get the necessary information to generate the view port image. In the layout of FIG. 10, only one pole region and some panoramic regions (for example four, depending on the width of the field of view) have to be accessed to generate the viewport image. Thus, in every case, less regions have to be accessed. Such a sectorization of the space may be preferred when information about the expected gaze path of the user is known at the encoder: for example, when the field of view of the renderer is the same for every target device, when regions of interest of the volumetric content are indicated by an operator and/or automatically detected and/or when user's gaze path routines are known at the encoder. In the example sectorization illustrated in FIG. 10, different amplitudes for angles Theta and Phi may be determined according to such information.

However, these data are difficult to obtain at the encoder side. According to the present principles, at least two different sectorized layouts of the same volumetric content are simultaneously used to support partial rendering by the user devices and particularly low-end devices. The design of only one sectorization adapted to all user navigation scenarios can output to a non-efficient use of the techniques as seen in relation to FIG. 9. The conflict concerns the necessary amplitude of the equator and poles areas following Φ when the user's gaze is navigating around the equator or around the poles; respecting equator amplitude for equator navigation leads to a pole amplitude too small for pole navigation and vice versa.

According to the present principles, a same volumetric content (i.e. a set of patches) is encoded within two different atlases, each atlas being divided in regions storing patches of one sector of a sectorization different from the sectorization used for the other atlas. In a variant the volumetric content is encoded in more than two atlases, each responsive to its own sectorization. In another embodiment, a single atlas is divided in regions in order to be responsive to two different sectorizations. Regions are signaled in the data stream encoding the atlas as metadata. In this embodiment, two sectorizations are straightforwardly signaled for the central patch of FIG. 6, 7, 9 or 10. A region for peripheral patches is differently defined, for instance as 3 sub-regions: a first sub-regions comprising patches shared by corresponding sectors of the two sectorizations (e.g. north pole sectors), a second sub-region reserved for patches specific to the sector of the first sectorization and a third sub-region reserved for patches specific to the sector of the second sectorization. The resulting atlas comprises additional unused space and then be bigger. However, as peripheral patches are small, this size increase is valuable, in terms of bit-rate, compared to the embodiment in which two atlases are generated. The encoding of multiple sectorizations in a single atlas may be extended to more than two sectorizations.

Atlases layout, that is the division in regions and the organization of patches within each region, may be determined for one or more Group Of Pictures (GOP). Atlas images a same GOP (for example 8 or 16 successive pictures of a video data stream) may share the same layout. The next GOP may have a different layout, for instance by having a different division in regions and/or a different organization of patches within a region.

FIG. 11 illustrates a method 110 for generating a viewport image of a scene encoded in an atlas image, according to a non-limiting embodiment of the present principles. The decoding process may implement the following steps. In a step 111, for a new frame for instance at a new GOP, the decoder determines a sectorization among a plurality of sectorizations of a volumetric content. The selecting of a sectorization may depend on the current view direction and/or the current pose of the virtual camera controlled by the user to watch the volumetric content. In a variant, the selection of the sectorization depends on a change of the gaze direction and/or the pose of the camera, that is on the user's navigation within the volumetric content. Once the sectorization is selected, at least one sector of this sectorization is selected according to the view direction and the field of view of the virtual camera. Indeed, a 3DoF+ rendering device comprise means for the user to control a virtual camera to visualize the scene from a point of view in a viewing zone of the space of the scene. Sectors of the within the field of view of the viewer are selected. In a variant, neighbor sectors are selected in order to anticipate movements of the virtual camera.

At the decoder, the switch (i.e; the change of the selection) between the two sectorizations may be performed as a function of the video delivery or decoding constraints, for example. For instance, a switch to a different sectorization in the middle of a GOP may not be a valuable choice because it would require decoding the previous 'I' picture to be able to decode the current one. This would generate latency and consequently video freeze. Another constraint is that, depending on the protocol used to receive video, the switching time may have to be aligned to data chunks. Therefore, it is necessary to have a recovery area where a sectorization or the other may be indifferently used. For a desired view direction ($\theta_{user}$, $\Phi_{user}$), the atlas with the appropriate layout is selected according to $\Phi_{user}$ value. In the example of a transition from an equatorial layout (e.g. as illustrated in relation to FIG. 9) to a polar layout (e.g. as illustrated in relation to FIG. 10). When the FOV is moving towards the North pole, if $\Phi_{user}$ is greater than a given threshold depending on the amplitude of the polar sectorization, a switch to the polar layout may be operated. The prediction of the future gaze direction is a key element in the selection of the sectorization. The transition from a polar layout to an equatorial layout obeys similar rules.

At a step 112, an atlas encoding the volumetric content and organized according a layout based on the selected sectorization is obtained from a data stream. The data stream may be read from a memory (i.e. the different atlases are stored in the memory) or requested and received from a network. Metadata are obtained at the same time from the same source or from a different source. The metadata describe a division of the atlas in regions and associated a region with a sector of the space of the scene. Pixels of a region of the atlas are a projection of points of the scene located in the sector associated with the region. At a step 113, the renderer accesses the pixels of the regions of the atlas associated with the selected regions to generate the viewport image of the scene seen from the point of view of the virtual camera. The number of accessed pixels and so of de-projected points is limited to points of viewed sectors of the space of the scene.

FIG. 12 illustrates a method 120 for encoding a scene, according to a non-limiting embodiment of the present principles. At a step 121, the scene is divided in non-overlapping sectors according to at least two different sectorization of the space of the scene (i.e; the volumetric content). Patches are obtained, by sectors of each of sectorization. A patch is a picture that is a projection of points of the scene comprised in a unique sector of one sectorization. At a step 122, a region layout is selected for the atlases. Each region of the layout is associated with a sector of at least one of the different sectorizations of the space of the scene. A sector may be associated with several regions. At this step, patches are packed in regions associated with their sector of each sectorization. The atlas is generated and encoded in a data stream with metadata describing the regions and associating regions with their sector of the space of the scene. In a variant, metadata are encoded in a different data stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   selecting a sectorization of a 3D space of a volumetric content among at least two different sectorizations of the 3D space and a sector of the selected sectorization according to a view direction within the 3D space, wherein each of the at least two different sectorizations divides the 3D space in disjointed sectors;
   obtaining an atlas image representative of the volumetric content, the atlas image being organized according to the at least two different sectorizations, wherein a region of the atlas image is associated with a sector of each of the at least two different sectorizations; and
   rendering the volumetric content for the view direction by accessing regions of the atlas image associated with the disjointed sectors.

2. The method of claim 1, wherein the atlas image is packing patch pictures, a patch picture belonging to one region of the atlas image and being a projection of points of the volumetric content comprised in the sectors of the 3D space associated with the one region.

3. The method of claim 1, wherein the selecting a sectorization is performed according to a change of the view direction in time.

4. The method of claim 1, wherein the volumetric content is a volumetric video and wherein the selecting a sectorization is performed for a group of pictures of the volumetric video.

5. The method of claim 1, wherein the atlas image is obtained from a data stream comprising metadata associating the region of the atlas image with the sectors of the at least two different sectorizations.

6. The method of claim 1, wherein the selecting a sectorization is performed according to a prediction of a future value of the view direction.

7. A non-transitory computer readable storage medium having stored thereon instructions for implementing the method of claim 1 when executed by one or more processors.

8. A device comprising a processor configured for:
    selecting a sectorization of a 3D space of a volumetric content among at least two different sectorizations of the 3D space and a sector of the selected sectorization according to a view direction within the 3D space, wherein each of the at least two different sectorizations divides the 3D space in disjointed sectors;
    obtaining an atlas image representative of the volumetric content, the atlas image being organized according to the at least two different sectorizations, wherein a region of the atlas image is associated with a sector of each of the at least two different sectorizations; and
    rendering the volumetric content for the view direction by accessing regions of the atlas image associated with the disjointed sectors.

9. The device of claim 8, wherein the processor selects a sectorization according to a change of the view direction in time.

10. The device of claim 8, wherein the volumetric content is a volumetric video and wherein the processor selects a sectorization for a group of pictures of the volumetric video.

11. The device of claim 8, wherein the processor selects a sectorization is according to a prediction of a future value of the view direction.

12. The device of claim 8, wherein the atlas image is packing patch pictures, a patch picture belonging to one region of the atlas image and being a projection of points of the volumetric content comprised in the sectors of the 3D space associated with the one region.

13. The device of claim 8, wherein the atlas image is obtained from a data stream comprising metadata associating the region of the atlas image with the sectors of the at least two different sectorizations.

14. A method comprising:
    determining at least two different sectorizations of a 3D space of a volumetric content, wherein a sectorization divides the 3D space in disjointed sectors; and
    generating an atlas image divided in regions, wherein each region is associated with a sector of each of the at least two different sectorizations,
    wherein points of the volumetric content comprised in sectors of the 3D space are projected into pixels of a region associated with the disjointed sectors.

15. A non-transitory computer readable storage medium having stored thereon instructions for implementing the method of claim 14 when executed by one or more processors.

16. A device comprising a processor configured for:
    determining at least two different sectorizations of a 3D space of a volumetric content, wherein a sectorization divides the 3D space in disjointed sectors; and
    generating an atlas image divided in regions, wherein each region is associated with a sector of each of the at least two different sectorizations:
    wherein points of the volumetric content comprised in sectors of the 3D space are projected into pixels of a region associated with the disjointed sectors.

* * * * *